United States Patent
Achinger et al.

(10) Patent No.: US 12,018,744 B2
(45) Date of Patent: Jun. 25, 2024

(54) ACTUATORS AND USE OF A TOLERANCE RING AND/OR A TOLERANCE BUSHING

(71) Applicant: AUMA RIESTER GMBH & CO. KG, Müllheim (DE)

(72) Inventors: Robert Achinger, Nuremberg (DE); Rudolf Morlang, Villingen-Schwenningen (DE)

(73) Assignee: AUMA Riester GmBH & Co. KG, Müllheim (DE)

( * ) Notice: Subject to any disclaimer, the term of this patent is extended or adjusted under 35 U.S.C. 154(b) by 51 days.

(21) Appl. No.: 17/009,461

(22) Filed: Sep. 1, 2020

(65) Prior Publication Data

US 2021/0071747 A1    Mar. 11, 2021

(30) Foreign Application Priority Data

Sep. 9, 2019 (DE) .......................... 102019124148.0

(51) Int. Cl.
| | |
|---|---|
| *F16H 57/02* | (2012.01) |
| *F16K 37/00* | (2006.01) |
| *G05G 1/08* | (2006.01) |
| *G05G 7/00* | (2006.01) |
| *G08B 5/36* | (2006.01) |
| *H04W 4/80* | (2018.01) |

(52) U.S. Cl.
CPC ......... *F16H 57/02* (2013.01); *F16K 37/0041* (2013.01); *G05G 1/08* (2013.01); *G05G 7/00* (2013.01); *G08B 5/36* (2013.01); *H04W 4/80* (2018.02); *F16H 2057/02026* (2013.01); *F16H 2057/02034* (2013.01)

(58) Field of Classification Search
CPC ........... F16H 57/02; F16H 2057/02026; F16H 2057/02034; H04W 4/80; G05G 1/08; G05G 7/00; G08B 5/36; F16K 31/055; F16K 31/05
See application file for complete search history.

(56) References Cited

U.S. PATENT DOCUMENTS 2,782,827 A * 2/1957 Rosan .................... F16B 39/10
411/108
6,003,837 A * 12/1999 Raymond, Jr. ....... F16K 31/045
251/129.12
8,342,478 B1* 1/2013 Cordray ............. F16K 37/0075
137/554

(Continued)

FOREIGN PATENT DOCUMENTS

CN   106224615 A * 12/2016 ............. F16K 31/05
DE       1042311      10/1958

(Continued)

OTHER PUBLICATIONS

Corresponding European Application Search Report.
(Continued)

*Primary Examiner* — Thomas C Diaz
(74) *Attorney, Agent, or Firm* — Grogan, Tuccillo & Vanderleeden, LLP

(57) ABSTRACT

The invention relates to improvements in the technical sector of actuators. To this end, the actuator, inter alia, is proposed, the actuator housing of which has at least one stage, on which at least one functional surface is formed with at least one access to the actuator housing.

20 Claims, 6 Drawing Sheets

(56) References Cited

U.S. PATENT DOCUMENTS

| | | | | |
|---|---|---|---|---|
| 10,306,792 B2* | 5/2019 | Sturm | ............... | H05K 5/0017 |
| 2017/0310187 A1 | 10/2017 | Becerra et al. | | |
| 2018/0187790 A1* | 7/2018 | Schmidt | ............... | F16K 31/046 |

FOREIGN PATENT DOCUMENTS

| | | |
|---|---|---|
| DE | 1192897 B | 5/1965 |
| DE | 19635895 A1 | 8/1997 |
| DE | 199 09 227 A1 | 10/1999 |
| DE | 19921553 A1 | 11/2000 |
| DE | 69709325 T2 | 8/2002 |
| DE | 10143168 A1 | 3/2003 |
| DE | 202015101074 U1 | 3/2015 |
| DE | 202015002703 U1 | 5/2015 |
| DE | 102014106517 A1 | 11/2015 |
| DE | 102015205638 A1 | 3/2016 |
| DE | 202015004519 U1 | 9/2016 |
| DE | 102015119002 A1 | 5/2017 |
| DE | 102016107000 A1 | 10/2017 |
| DE | 102011118895 B4 | 8/2018 |
| EP | 0 111 350 A1 | 6/1984 |
| EP | 3181966 A1 | 6/2017 |
| EP | 3 278 932 A1 | 2/2018 |

OTHER PUBLICATIONS

United States Office Action in connection with U.S. Appl. No. 17/009,461 dated Apr. 29, 2022.
1 German Office Action dated Apr. 11, 2023 from corresponding German Application No. 10 2019 124 150.2.
Corresponding Chinese Office Action, dated Dec. 18, 2023.

* cited by examiner

ACTUATORS AND USE OF A TOLERANCE RING AND/OR A TOLERANCE BUSHING

CROSS REFERENCE TO RELATED APPLICATION

This application claims priority to German Patent Application No. 10 2019 124 148.0 filed on Sep. 9, 2019, which is hereby incorporated by reference in its entirety.

FIELD OF THE INVENTION

The invention relates to actuators which are previously known from the prior art and from actual use in the most varied of embodiments.

Actuators comprise an actuator housing, in which an actuator motor is arranged, and are used, for example, to actuate fittings and/or valves.

There are application cases, for example in shipbuilding or even in plant engineering, in which a plurality of such actuators has to be installed in a comparatively small installation space.

SUMMARY OF THE INVENTION

The object of the invention is to obtain an actuator of the previously mentioned type, which can be easily installed, even in a comparatively small installation space.

In order to achieve this object, an actuator is obtained having the features of the first independent claim, which is based on such an actuator. In order to achieve the object, particularly an actuator is thus proposed with an actuator housing, in which an actuator motor is arranged, wherein the actuator housing has at least one stage with at least one functional surface, on which at least one access to the actuator housing can be formed and/or is formed.

Due to the stage on the housing, a functional surface is obtained, which can be arranged, for example, on a freely accessible front side or back side of the actuator housing. The functional surface can be used to attach position indicators, for electrical connections into the housing, and/or, for example, also to supply an end stop screw, which limits the actuating path of the drive and/or of a valve actuated with the actuator or a fitting.

Thus, the actuator according to the invention can be placed in the installation space provided for it such that lateral surfaces of the actuator housing do not have to be accessible. In this manner, it is possible, for example, to arrange several of such actuators close to one another in order to utilize the existing installation space in the best manner possible.

The actuator housing may comprise at least two housing parts, which are arranged offset as relates to one another to form the stage. The at least two housing parts may be arranged offset to one another, for example, transversely as relates to an axis of rotation of the actuator motor. The offset of the at least two housing parts with respect to one another can implement the formation of the stage and thus the formation of the functional surface.

With one embodiment of the actuator, the at least one functional surface, which is formed on the stage and/or caused by the offset, can be aligned at a right angle to a direction of the offset. A vector, with which the direction of the offset can be described, is positioned at a right angle on the functional surface in this case.

With another embodiment of the actuator, it may be provided that at least one functional surface of the actuator is aligned in the direction of the offset, with said functional surface being caused by the offset. In this case, a vector, with which the direction of the offset can be described, is positioned somewhat or partially within the functional surface.

In order to achieve the object, an actuator is also proposed which has the means and features of the second independent claim, which is based on such an actuator. In particular, an actuator is thus proposed which has a handwheel which is arranged, preferably eccentrically, on a functional surface, for example a functional surface as previously mentioned, of an actuator housing, for example an actuator housing as previously already mentioned. The handwheel in this case has a diameter which is at most as large as, or preferably smaller than, a maximum measurable distance between two outer sides opposite each other, between which a center of rotation of the handwheel is arranged.

The handwheel here can particularly protrude laterally over one of the previously mentioned outer sides of the actuator housing of the actuator. In this manner, it is possible to position several of such actuators close to each other, because lateral housing surfaces can remain free of functional elements, for example free of a handwheel, also with this embodiment of an actuator. Thus, an actuator is obtained which is especially suitable for integration into a comparatively small installation space.

The handwheel can be arranged, for example, on a side, particularly on a front side of a stage, for example a stage as previously mentioned, of the actuator housing.

With each of the previously described actuators, the actuator motor can be arranged in one of at least two housing parts of the actuator housing. An actuator output shaft can be arranged on a housing part, offset thereto, of the actuator housing. The actuator motor can be connected to the actuator output shaft via an actuator gear. In this case, the actuator gear can extend from the housing part with the actuator motor to the housing part with the actuator output shaft. The actuator gear thus enables the positioning of the actuator motor in the one housing part, spaced apart from the actuator output shaft, which is arranged in the other housing part.

In one embodiment of the actuator, it is provided that at least one functional surface of the at least one previously mentioned functional surface is formed between an upper side and a lower side of the actuator housing.

In one embodiment of the actuator, a functional surface of the at least one functional surface can be formed on a side of the actuator housing facing away from an upper side of the actuator housing. A feedthrough for an electrical connection into the actuator housing can be formed on this functional surface.

In one embodiment of the actuator, a functional surface of the at least one functional surface is formed on a side of the actuator housing facing away from a lower side of the actuator housing. In one embodiment of the actuator, a functional surface of the at least one functional surface can be arranged on a side of the housing which is facing away from a side from which an actuator output shaft, for example as previously mentioned, exits.

In one embodiment of the actuator, a functional surface of the at least one functional surface can be formed in an axial extension of the actuator output shaft and preferably with at least one indicator and/or at least one end stop screw and/or at least one operating element. The previously mentioned end stop screw can also be characterized as an end position adjusting screw. In one embodiment of the actuator, the actuator housing can also have a functional surface in an axial extension of the actuator motor.

For some applications, it is desirable to actuate the actuator via Bluetooth. However, it is often necessary to implement the actuator in an explosion-proof design, which means that its actuator housing should have as few passages as possible. Furthermore, it is known to generate status messages relating to the actuator via displays. With the actuators previously known in actual use, these displays are arranged behind relatively large openings. In order to satisfy the explosion-protection requirements placed on the actuator housings of such actuators, the relatively large openings must be closed with massive and accordingly expensive viewing windows.

The object of a further aspect of the invention is thus to obtain an actuator, particularly such as has been previously described, which can be actuated by means of Bluetooth and simultaneously has explosion protection which is relatively simple to implement.

In order to achieve this object, an actuator is proposed having the features of the third independent claim, which is based on such an actuator. In particular, in order to achieve the object, thus an actuator is proposed, which has an actuator housing with at least one communication hole as a passage for a Bluetooth signal from the actuator housing, wherein the communication hole has a maximum diameter of 30 mm and is closed with a viewing window, and wherein an LED is arranged in the actuator housing, the LED signal of which is perceptible to a user of the actuator through the viewing window.

With one embodiment of this actuator, the communication hole may have a maximum diameter of 25 mm.

It has been determined that a communication hole with a maximum diameter of 30 mm, preferably a maximum of 25 mm, is sufficiently large enough such that Bluetooth signals can pass through the communication hole in a satisfactory manner. Even though the communication hole as a passage for Bluetooth signals is comparatively small such that a display, as is previously known from practical use, is potentially difficult to integrate or hardly possible, this is compensated for by the use of at least one LED for the status display.

Furthermore, the actuator according to the invention is characterized by explosion protection which is simple to implement. The comparatively small communication hole can be closed with a correspondingly small viewing window in order to satisfy the explosion protection requirements which are often required. Thus, the material and finally also the cost outlay for providing the desired explosion protection with the actuator according to the invention is less than with those actuators having comparatively large displays, without the functionality thereby provided with the actuator being impacted.

With one embodiment of the actuator, a Bluetooth module is provided in the actuator housing, behind the viewing window. In this manner, low-interference or even interference-free communication with the Bluetooth module is possible, even when the actuator housing itself consists of a material which shields radio signals.

With a communication hole of maximum 30 mm diameter, preferably of maximum 25 mm diameter, a satisfactory compromise is found between the transmissibility of Bluetooth signals through the communication hole and the desired explosion protection.

In order to optimize communication with the Bluetooth module of the actuator, it may be advantageous if the Bluetooth module is arranged in a central spot of a projection of the communication hole onto a circuit board with the Bluetooth module. In this manner, it is ensured that the Bluetooth module is arranged in the center of the communication hole to the extent possible such that Bluetooth signals, which are to be exchanged between the Bluetooth module and a receiver and/or transmitter, can reliably reach the Bluetooth module from as many different directions as possible. The transmit and receipt range of the Bluetooth module located within the actuator housing can be maximized by this measure.

To this end, the Bluetooth module may be arranged, for example, at a distance between 0 mm and 15 mm, especially preferably at a distance between 5 mm and 10 mm, apart from the previously mentioned central spot and/or from the communication hole and/or from the viewing window, with which the communication hole is closed.

In one embodiment of the actuator, the use of an LED as a status display means of the actuator makes it possible to arrange said LED outside of the previously mentioned central spot of the projection of the communication hole onto the circuit board with the Bluetooth module. In this manner, the installation space available in the region of the central spot can be used for the Bluetooth module and/or an antenna of the Bluetooth module. A light signal generated by the LED can then also still be perceived through the communication hole by a user when the LED is arranged outside of the previously mentioned central spot.

In order to still be able to reliably perceive the LED when it is not arranged directly behind the viewing window, it may be advantageous when the viewing window, with which the communication hole is closed, consists of a diffuse material. Due to the diffuse material of the viewing window, the light signal generated by the LED within the actuator housing can be scattered. Thus, it is perceivable externally extensively independently of the position of the LED within the actuator housing.

With one embodiment of the actuator, it is provided that the Bluetooth module is arranged on a circuit board, for example the previously mentioned circuit board, in SMD technology. Furthermore, an integrated antenna of the Bluetooth module can be arranged in a central spot, for example the previously mentioned central spot, of a projection of the communication hole onto a circuit board, for example the previously mentioned circuit board, with the Bluetooth module. The transmit range and the receipt range of the Bluetooth module can be optimized by means of an antenna of the Bluetooth module arranged in the central spot.

A distance between the Bluetooth module and the communication hole may be less than an axial length of the communication hole. This measure can also contribute to compensating for the comparatively small size of the communication hole and the shielding effect of the actuator housing and thereby simplify communication with the Bluetooth module behind the communication hole.

In order to generate status information of the actuator via the LED, it may be advantageous if the actuator has a control unit which is configured for reading out and processing status messages of the actuator. The control unit may furthermore be configured to actuate the LED according to the status messages in order to output status information. In this manner, status information of the actuator can be output via the LED. The use of a comparatively large display to display the status is thus unnecessary. This is advantageous against the backdrop of the desired compactness and the explosion protection of the actuator, said explosion protection being as simple as possible to implement, because a display, on the one hand, requires more installation space and thus a larger actuator housing and, on the other hand, an accordingly large housing opening in the actuator housing, which can make the explosion protection measures which must then be provided on the actuator housing more difficult.

With all of the previously mentioned actuators, it may be advantageous to limit the actuating range of the actuator by means of an end stop so that fittings or valves to be operated with the actuator are not damaged by the actuator.

Especially when the actuators are subjected to movements, for example impacts and/or vibrations, it is desirable to provide the end stop screws, used as the end stops, of such actuators with screw locks.

Previously, it has been customary to use locking nuts as the screw locks. However, the handling of such locking nuts is comparatively difficult, particularly when there is only a small installation space available. The object of the invention is to provide a compact design for locking the screws of such end stop screws for actuators and thus to obtain an actuator which can also easily be integrated into a small installation space.

In order to achieve the object, an actuator is proposed having the features of the further independent claim, which is based on such an actuator. In particular, in order to achieve the object, an actuator is thus proposed with an actuator housing having at least one adjustable end stop screw as an end stop for the actuating movement of the actuator, wherein the end stop screw is secured, in a force-fitting manner, with a screw lock in the form of a lock bushing.

With one embodiment of the actuator, it is provided that the lock bushing is arranged in the locking position between an outer circumference of a screw head of the end stop screw and an inner circumferential wall of a screw hole of the actuator housing, into which the end stop screw is screwed, preferably with pressing. The lock bushing is thus wedged between the outer circumference of the screw head of the end stop screw and the inner circumferential wall of the screw hole for the end stop screw, for example when the end stop screw is tightened, and can thus prevent the end stop screw from being unintentionally loosened due to movements, impacts, and/or vibrations, which can act upon the actuator, whereby the end stop could be adjusted for the actuating movement of the actuator.

With one embodiment of the actuator, a tolerance ring and/or a tolerance bushing, as they are previously known, for example, as force-fitting and detachable connecting elements with shaft-hub connections, can be used as the lock bushing.

Such a tolerance ring and/or such a tolerance bushing can be produced, for example, from a slotted ring made of spring-hinge material with wave-like characteristics.

To achieve the object, finally also the use of a tolerance ring and/or a tolerance bushing, particularly a shaft-hub connection, is proposed as a screw lock for an end stop screw of an actuator, particularly of an actuator according to any of the claims based on an actuator.

The invention is explained in greater detail below by means of exemplary embodiments but is not limited to these exemplary embodiments. Further exemplary embodiments result from a combination of the features of individual or several claims with one another and/or a combination of individual or several features of the exemplary embodiment.

BRIEF DESCRIPTION OF THE DRAWINGS

The following is shown, sometimes represented by diagram.

DETAILED DESCRIPTION OF THE PREFERRED EMBODIMENT

Figure 1:
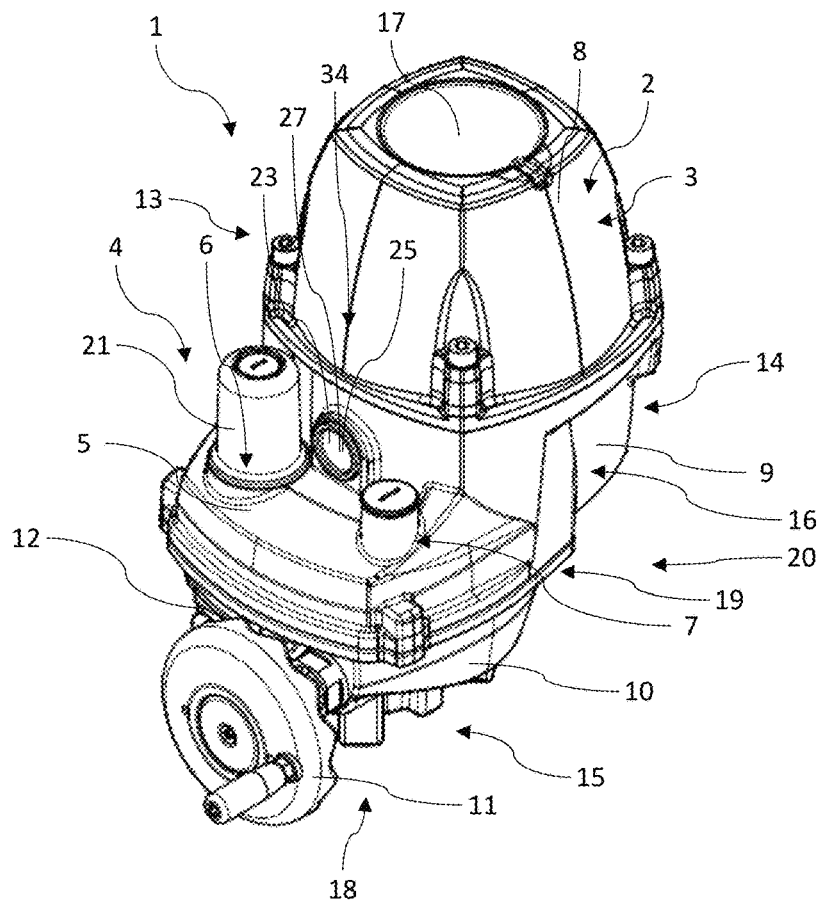
FIG. 1: an isometric representation of an actuator, the actuator housing of which has a stage with at least one functional surface formed thereon.
Figure 2:
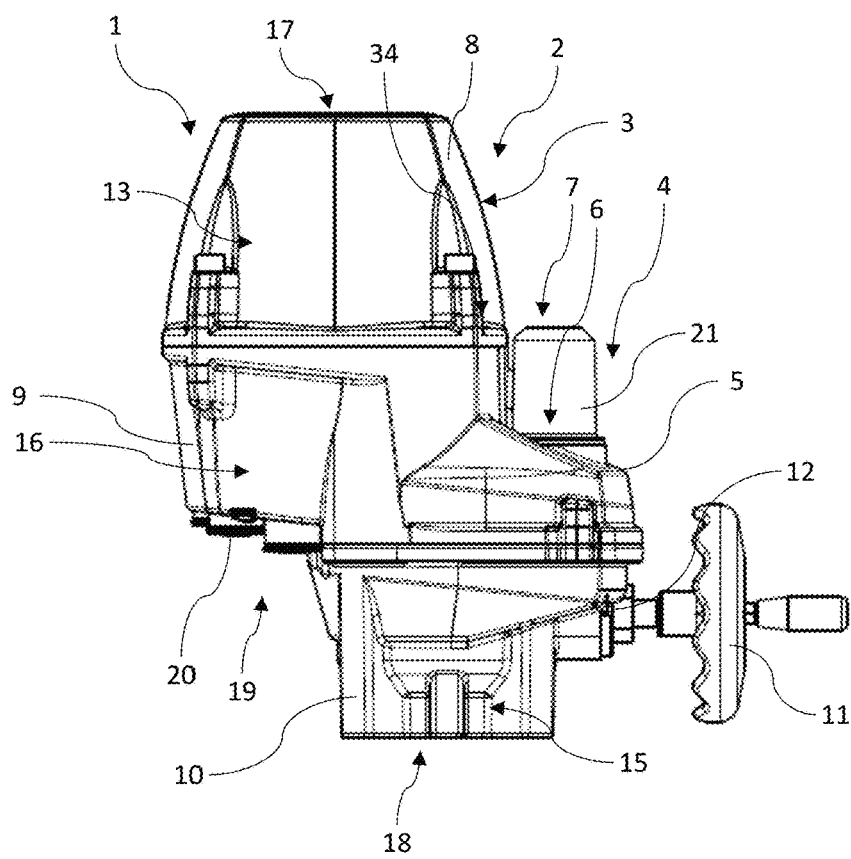
FIGS. 2 to 4: different views of the actuator shown in FIG. 1.
Figure 3:
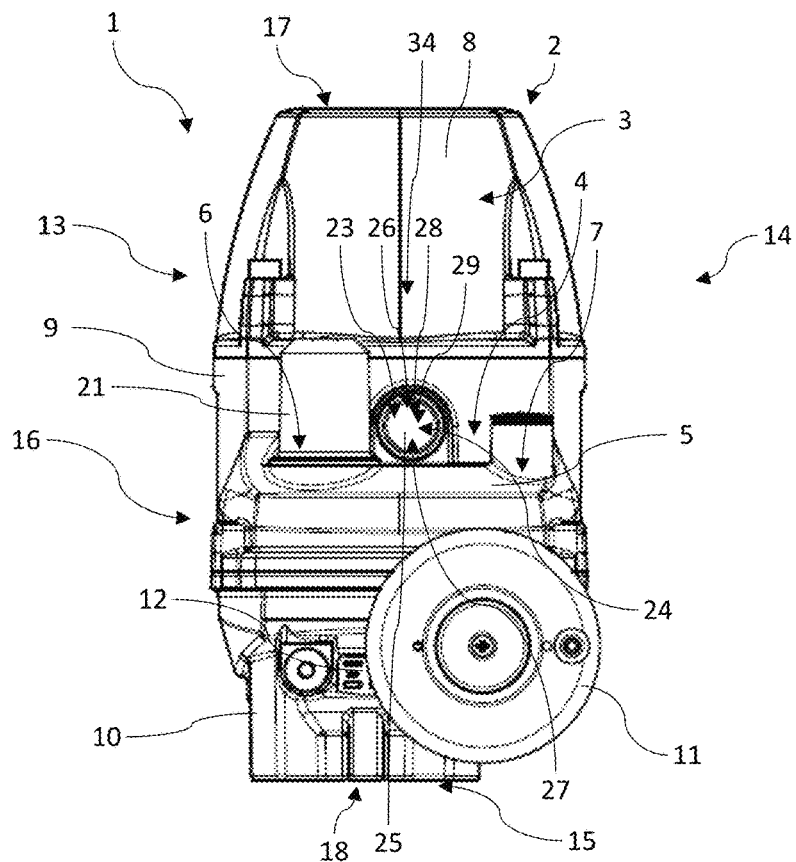

All the figures show at least components of an actuator designated overall as 1. The actuator 1 has an actuator housing 2, in which an actuator motor 3 is arranged. The actuator housing 2 has at least one stage 4, on which a functional surface 5 is formed. In the exemplary embodiment shown of the actuator 1, a total of two accesses, 6 and 7, to the actuator housing 2 are formed on the functional surface 5.

The actuator housing 2 of the actuator 1 comprises three housing parts 8, 9, 10, wherein the two outer housing parts, 8 and 10, are arranged offset to one another in order to form the stage 4 of the actuator housing 2 transversely as relates to an axis of rotation of the actuator motor 3. In this case, the offset of the two housing parts, 8 and 10, with respect to one another can be considered the cause of the formation of the stage 4, on the one hand, and the functional surface 5, on the other.

The functional surface 5 is formed on the middle housing part 9 of the actuator housing 2 and is aligned transversely as relates to a direction of the offset of the two remaining housing parts, 8 and 10, with respect to one another.

The offset of the two housing parts, 8 and 10, with respect to one another in this case means that longitudinal center lines of the housing parts, 8 and 10, are not identical but instead are offset as relates to each other.

Figure 4:
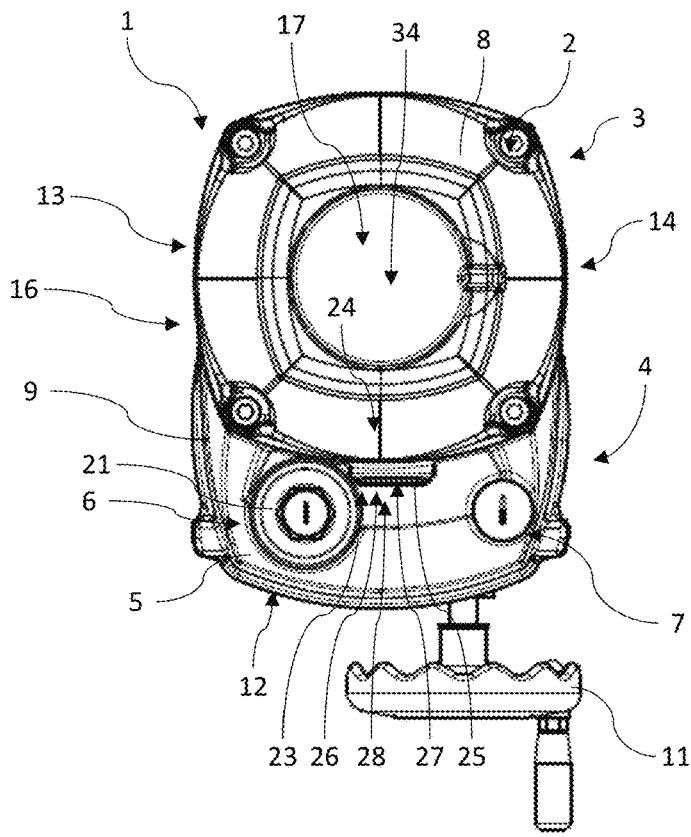
Figure 5:
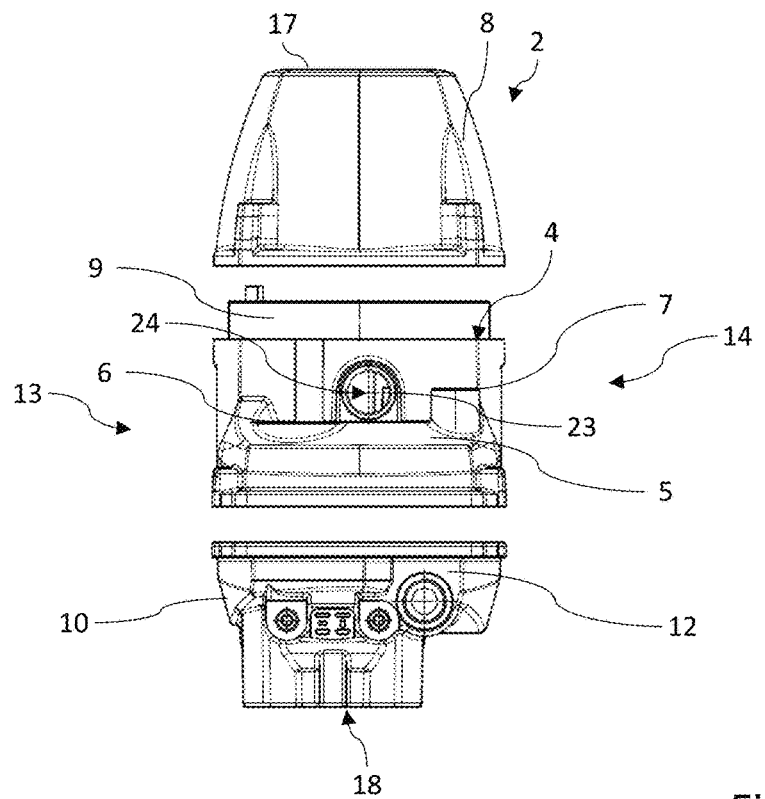
FIG. 5: an exploded view of the actuator housing of the actuator shown in the previous figures in a front view, wherein a communication hole as a passage for Bluetooth signals is easy to see here.
Figure 6:
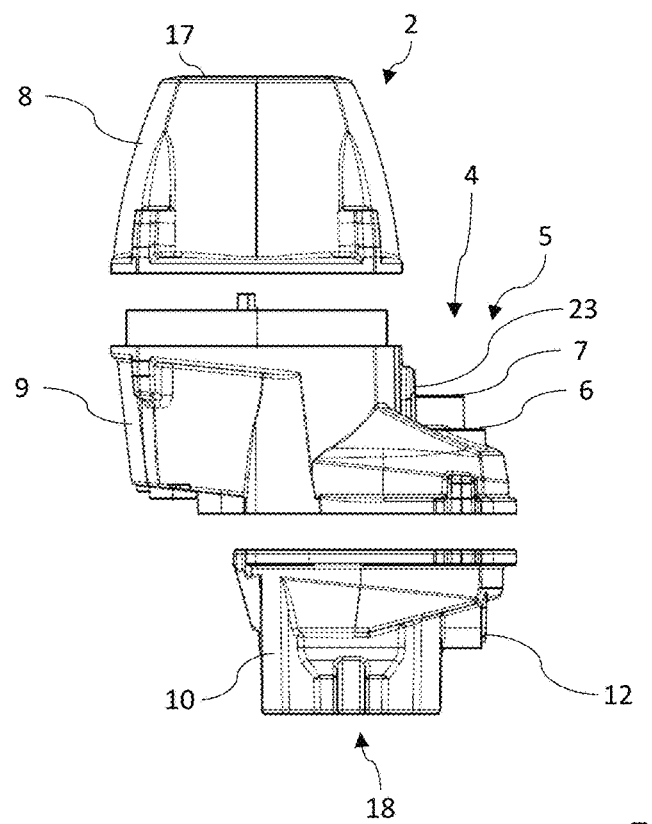
FIG. 6: an exploded view of the actuator housing shown in the previous figures in a side view.
Figure 7:
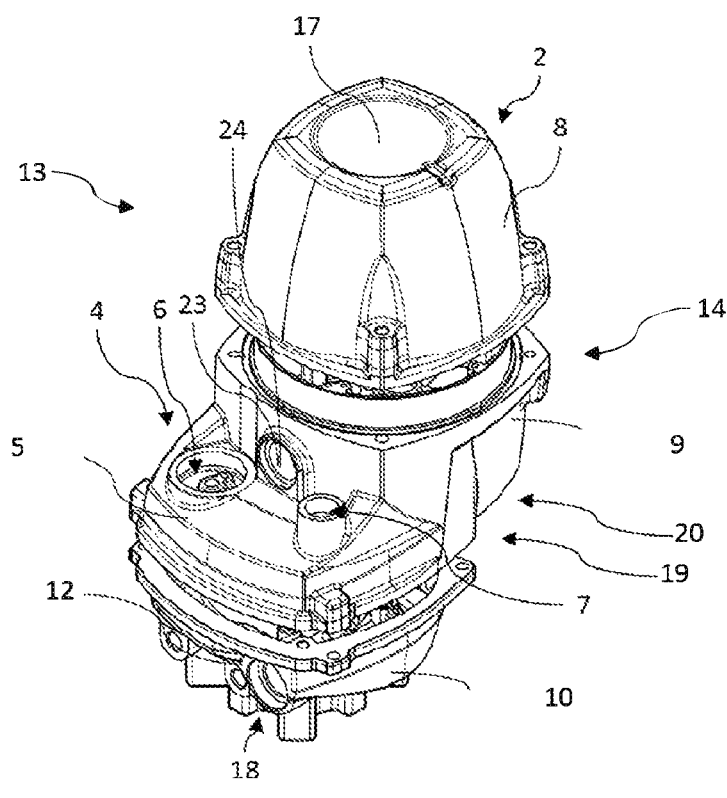
FIG. 7: an isometric view of the actuator housing shown in the previous figures in an exploded view.

FIGS. 1 to 4 show that the actuator 1 furthermore has a handwheel 11, with which the actuator 1 can be manually actuated as needed. The handwheel 11 is arranged eccentrically on a further functional surface 12 formed on the lower housing part 10 of the actuator housing 2. The handwheel 11 in this case has a diameter which is smaller than a maximum measurable distance between two outer sides, 13 and 14, opposite each other, between which a center of rotation of the handwheel 11 is arranged. FIG. 4 shows that the hand wheel 11 protrudes laterally over the right outer side 14 of the actuator housing 2 and is arranged on a front side or end face of the lower housing part 10.

Functional elements and/or accesses to the actuator housing 2 are not formed on the left outer side 13 or on the right outer side 14.

The actuator motor 3 of the actuator 1 is arranged in the upper housing part 8 and the middle housing part 9 of the actuator housing 2, wherein an actuator output shaft 15 is arranged on the lower housing part 10 which is offset thereto.

The actuator motor 3 is connected to the actuator output shaft 15 via an actuator gear 16. In this case, the actuator gear 16 extends, at least partially, within the middle housing part 9 of the actuator housing 2 and thus connects the actuator 3 in the upper housing part 8 to the actuator output shaft 15 in/on the lower housing part 10.

The functional surface 5 formed on the stage 4 is formed between an upper side 17 and a lower side 18 of the actuator housing 2. The actuator housing 2 has a further functional surface 19, which is formed on a side of the actuator housing 2 which is facing away from the previously mentioned upper side 17 of the actuator housing 2. This further functional surface 19 is situated on a lower back side of the middle housing part 9, i.e., is facing away from the stage 4. This further functional surface 19 on the middle housing part 9 of the actuator housing 2 is ultimately only obtained in that the upper housing part 8 is arranged, offset to the lower housing part 10, on the middle housing part 9 of the actuator housing 2.

The functional surface 5 on the stage 4 of the actuator housing 2 and the further functional surface 19 are facing away from one another. The functional surface 5 can additionally be characterized as a functional surface which is arranged on a side of the actuator housing 3 which, for its part, is facing away from the lower side 18 of the actuator housing 2. Accesses to the actuator housing 2 are formed on each of the two functional surfaces, 5 and 19.

A feedthrough 20, inter alia, for an electrical connection of the actuator 1 is available on the functional surface 19 as an access to the actuator housing 2. In this case, the functional surface 19 is arranged in an axial extension of the actuator motor 3 and below the actuator motor 3.

The functional surface 5 formed on the stage 4 is arranged in an axial extension of the actuator output shaft 15. A display 21 of the actuator 1, in the form of a position indicator, is formed, inter alia, on said output shaft.

The actuator housing 2 of the actuator 1 additionally has a communication hole 23 as a passage for Bluetooth signals which are to be exchanged with a Bluetooth module 27 of the actuator 1 in order to operate the actuator 1.

The communication hole 23 has a maximum diameter of 30 mm, preferably of 25 mm, and is closed with a viewing window 25. An LED 26, the LED signal of which can be perceived through the viewing window 25, is furthermore arranged in the actuator housing 2. The previously mentioned Bluetooth module 27 of the actuator 1 is arranged within the actuator housing 2 and behind the viewing window 25. The Bluetooth module 27 is situated in a central spot 24 of a projection of the communication hole 23 onto a circuit board 28 with the Bluetooth module 27. This can be seen especially well from the representation according to FIG. 8.

The distance between the Bluetooth module 27 and the communication hole 23 in this case is between 0 mm and 15 mm, preferably between 5 mm and 10 mm. The LED 26 is arranged outside of the central spot 24 of the projection of the communication hole 23 onto the circuit board 28. The viewing window 25 consists of a diffuse material, whereby the LED 26 and its LED signal can still be easily perceived when the LED 26 is arranged outside of the central spot 24 of the projection of the communication hole 23 onto the circuit board 28. The viewing window 25 is preferably produced from plastic.

The Bluetooth module 27 is arranged on the circuit board 28 in SMD technology. It further comprises an integrated antenna 29, which is arranged in the central spot 24 of the projection of the communication hole 23 onto the circuit board 28 with the Bluetooth module 27. This facilitates communication with the Bluetooth module 27 via Bluetooth. The distance between the Bluetooth module 27 and the communication hole 23 in this case is less than an axial length of the communication hole 23.

The actuator 1 further comprises a control unit 34. The control unit 34 is configured to read out and process status messages related to the actuator 1. In order to output corresponding status information to a user of the actuator 1, the LED 26 can be accordingly actuated with the control unit 34. Thus, it is conceivable that the LED 26 generates a green light signal when the actuator 1 is in a state ready for operation. When there is a fault in the actuator, the LED 26 can be actuated with the control unit 34, for example, such that it flashes and/or generates a differently colored light signal, for example a red light signal.

Figure 8:
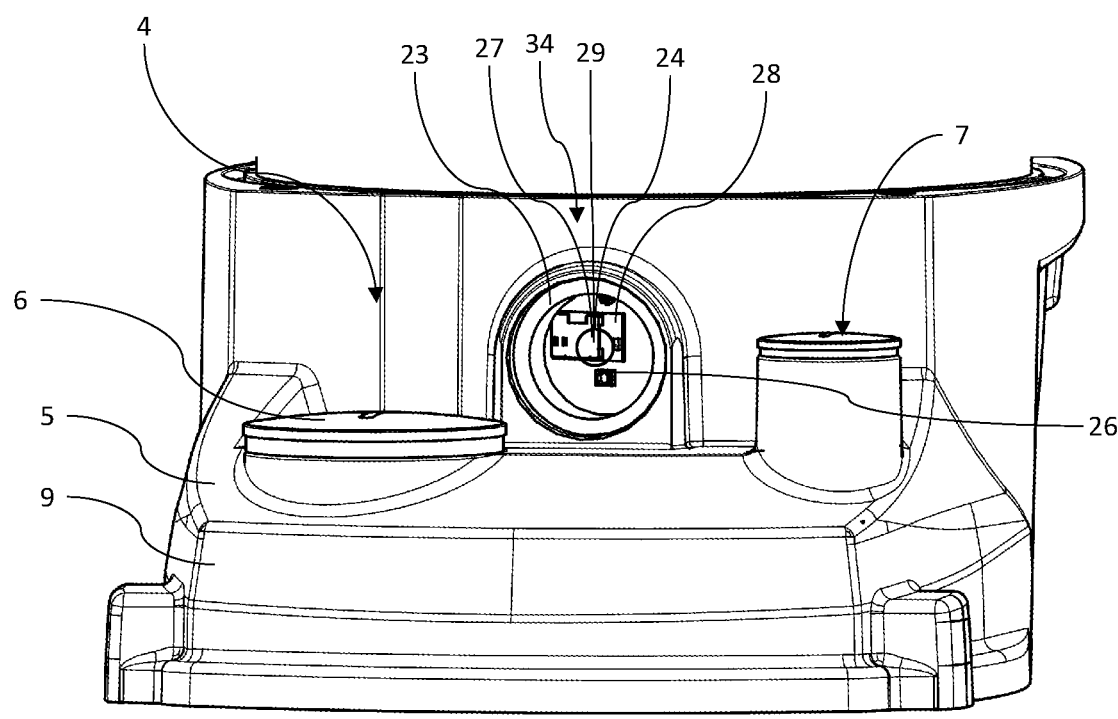
FIG. 8: a detailed view of the actuator housing depicted in the previous figures with the communication hole, a Bluetooth module behind it, an antenna, and an LED of the actuator are shown; as well as FIG. 9: a sectional view of the actuator shown in FIGS. 1 to 4 and 8 to illustrate an end stop screw as well as its screw lock in the form of a lock bushing.
Figure 9:
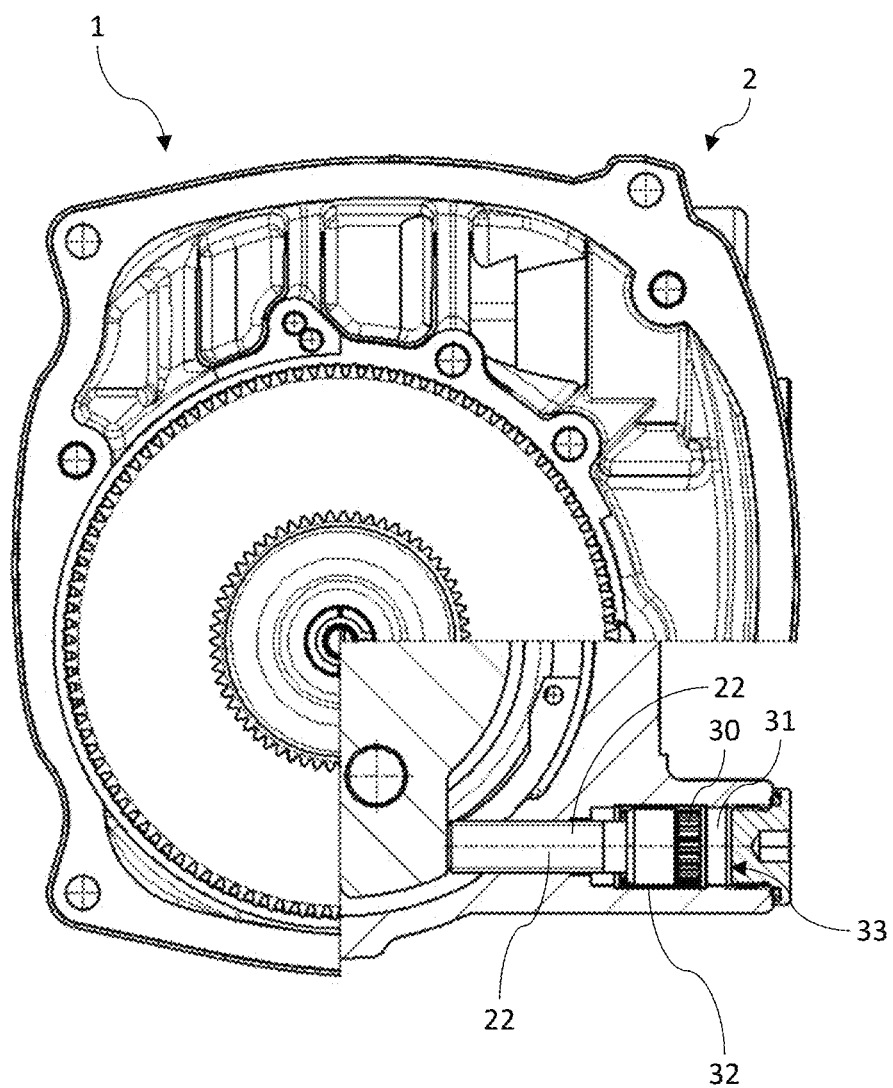

FIG. 9 shows a previously mentioned end stop screw 22, which serves as an end stop for an actuating movement of the actuator 1 and can be adjusted accordingly. The end stop screw 22 is secured, in a force-fitting manner, with a screw lock in the form of a lock bushing 30. The lock bushing 30 is arranged in its locking position, as shown in FIG. 8, between an outer circumference of a screw head 31 of the end stop screw 22 and an inner circumferential wall 32 of a screw hole 33 of the actuator housing 2, into which the end stop screw 22 is screwed with pressing.

A tolerance ring and/or a tolerance bushing, as they particularly are used with shaft-hub connections, is used as the lock bushing 30.

The invention relates to improvements in the technical sector of actuators. To this end, the actuator 1, inter alia, is proposed, the actuator housing 2 of which has at least one stage 4, on which at least one functional surface 5 is formed with at least one access 6, 7 to the actuator housing 2.

The invention claimed is:

1. An actuator, comprising:
  at least one upper actuator housing portion within which a motor with a motor shaft is arranged with a longitudinal first axis defined by the rotation of the motor shaft;
  a lower actuator housing portion with a longitudinal second axis defined by the rotation of an actuator output shaft which is arranged in the lower actuator housing portion, the first and second axes parallel to each other;
  an offset between the first and second axes;
  a stage with a first functional surface;
  wherein when the upper and lower actuator housing portions are mated, an actuator housing is formed about the actuator;
  wherein, when the upper and lower actuator housing portions are mated, the stage is formed integral with the at least one upper actuator housing portion and connected to an extension of the lower housing portion in a direction normal to the first and second axes, and extending over the second axis, the extension of the stage defined by the offset between the first and second axes;
  wherein at least one access to the actuator housing is formed on the first functional surface;
  wherein the first functional surface is a housing portion with at least one functional element providing a function apart from housing the actuator such that the functional surface is configured for at least one of the attachment of a position indicator or a display, or for electrical connections, or to supply an end stop screw limiting an actuating path of the actuator.

2. The actuator according to claim 1 wherein the first functional surface is aligned transversely at a right angle, as related to a direction of the offset.

3. The actuator according to claim 1, wherein the first functional surface is formed between an upper side and a lower side of the actuator housing.

4. The actuator according to claim 1, wherein the first functional surface is formed on a side of the actuator housing which is facing away from an upper side or a lower side of the actuator housing, the functional surface having at least one feedthrough for an electrical connection.

5. The actuator according to claim 1 wherein the actuator housing includes at least one communication hole for the passage of Bluetooth signals;
wherein the communication hole has a maximum diameter of 30 mm and is closed with a viewing window; and,
wherein an LED is arranged in the actuator housing such that an LED signal of which can be perceived through the viewing window.

6. The actuator according to claim 5, wherein the viewing window is plastic.

7. The actuator according to claim 5, wherein a Bluetooth module is provided in the actuator housing behind the viewing window.

8. The actuator according to claim 7, wherein the Bluetooth module is arranged in a central spot of a projection of the communication hole onto a circuit board with the Bluetooth module at a distance between 0 mm and 15 mm.

9. The actuator according to claim 8, wherein the LED is arranged outside the central spot of the projection.

10. The actuator according to claim 7, wherein the Bluetooth module is arranged on a circuit board using SMD technology.

11. The actuator according claim 7, wherein a distance between the Bluetooth module and the communication hole is less than an axial length of the communication hole.

12. The actuator according to claim 5, wherein the actuator further comprises:
a control unit configured for reading out and for processing status messages of the actuator, wherein the LED can be actuated via the control unit to output status information.

13. The actuator according to claim 1, wherein actuator housing having at least one adjustable end stop screw as an end stop for an actuating movement of the actuator, wherein the end stop screw is secured, in a force-fitting manner, via a lock bushing.

14. The actuator according to claim 13, wherein the lock bushing is arranged in a locking position between an outer circumference of a screw head of the end stop screw and an inner circumferential wall of a screw hole of the actuator housing, into which the end stop screw is screwed.

15. The actuator according to claim 13, wherein the lock bushing is a tolerance ring or a tolerance bushing of a shaft-hub connection.

16. The actuator according to claim 1, wherein the first functional surface is formed on a side of the actuator housing which faces away from a side from which an actuator output shaft exits.

17. The actuator according to claim 1, wherein the first functional surface is formed on a side of the actuator housing which faces away from a side that is arranged in an axial extension of an actuator output shaft, the first functional surface including at least one display, at least one end stop screw, or at least one operating element.

18. The actuator according to claim 1, wherein first functional surface is formed on a side of the actuator housing in an axial extension of the actuator motor.

19. The actuator according to claim 1, wherein the actuator has a handwheel which is arranged eccentrically on a second functional surface of the actuator housing.

20. The actuator according to claim 19, wherein the handwheel has a diameter which is smaller than a maximum measurable distance between two opposite outer sides of said housing, between which a center of rotation of the handwheel is arranged.

* * * * *